(No Model.) 3 Sheets—Sheet 1.
P. MAST.
APPARATUS FOR MANUFACTURING WIRE FENCING.
No. 566,332. Patented Aug. 25, 1896.
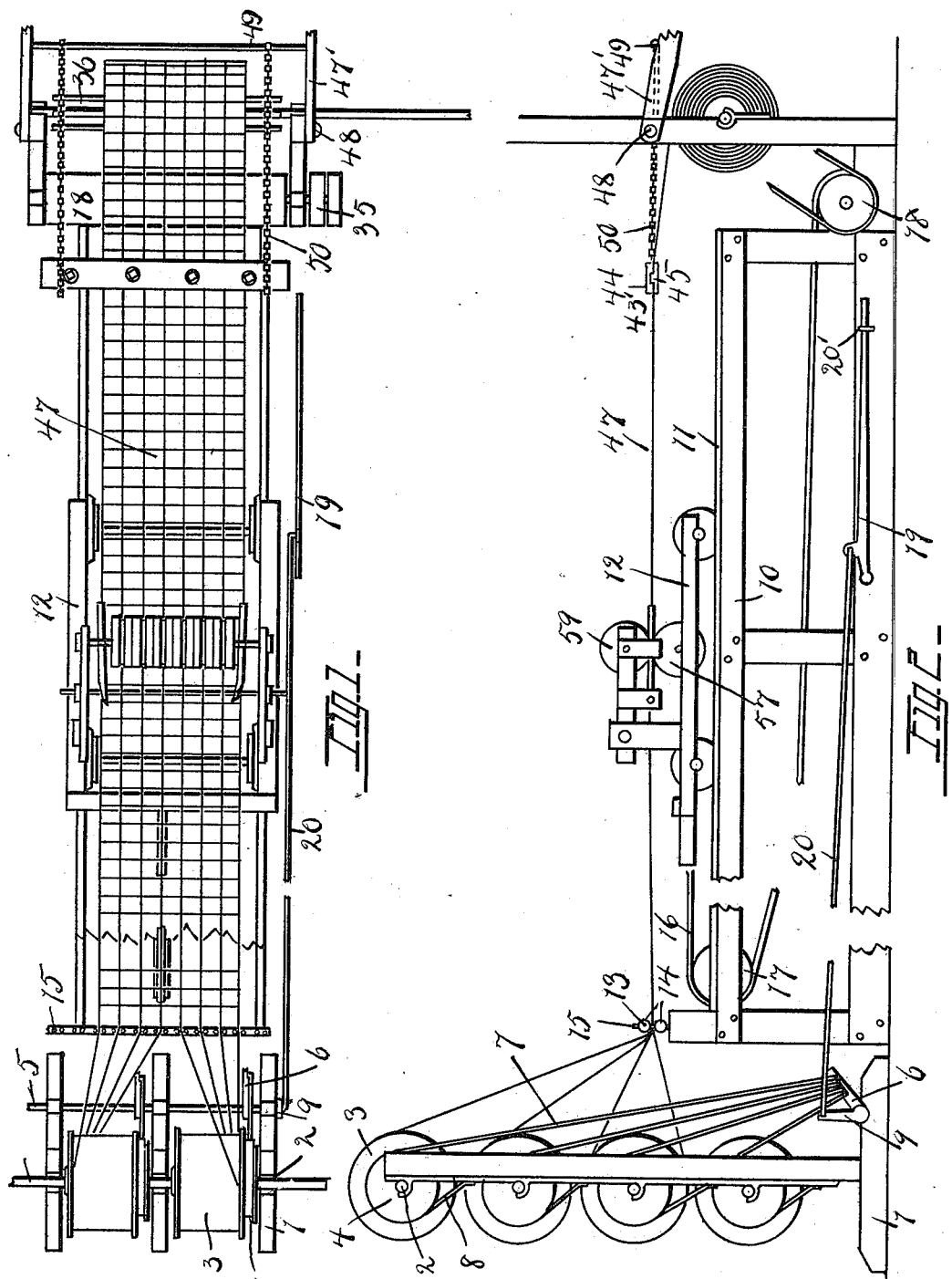
WITNESSES
Carl H. Keller.
Maud Schumacher.
INVENTOR
Peter Mast
By William Webster
Atty (No Model.) 3 Sheets—Sheet 2.

P. MAST.
APPARATUS FOR MANUFACTURING WIRE FENCING.

No. 566,332. Patented Aug. 25, 1896.

WITNESSES
Carl H. Keller.
Maud Schumacher.

INVENTOR
Peter Mast
By William Webster
atty

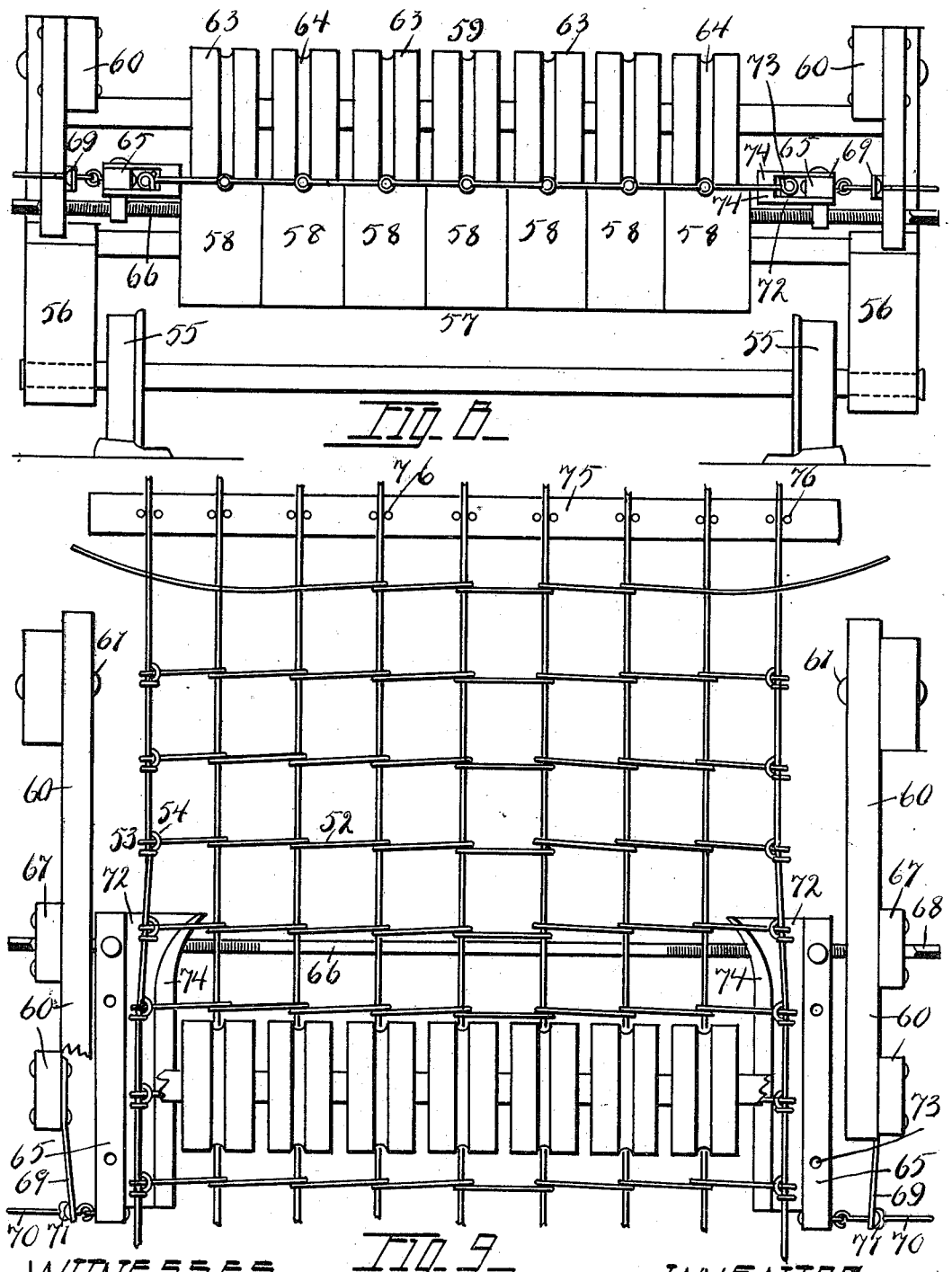

UNITED STATES PATENT OFFICE.

PETER MAST, OF DELPHOS, OHIO.

APPARATUS FOR MANUFACTURING WIRE FENCING.

SPECIFICATION forming part of Letters Patent No. 566,332, dated August 25, 1896.

Application filed November 27, 1895. Serial No. 570,254. (No model.)

*To all whom it may concern:*

Be it known that I, PETER MAST, of Delphos, county of Van Wert, and State of Ohio, have invented certain new and useful Improvements in an Apparatus for Manufacturing Wire Fences; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to an apparatus for manufacturing wire fence, and has for its object to produce a fence of uniform mesh by a mechanical manipulation of the wires which shall be continuous in its operation.

A further object is to mechanically insure a uniform tension longitudinally, and also a uniform separation laterally, and to provide mechanical means for compressing the knots of the transverse strands into uniformity.

With these objects in view the invention consists in the parts and combination of parts hereinafter described, and pointed out in the claims.

Figure 3:
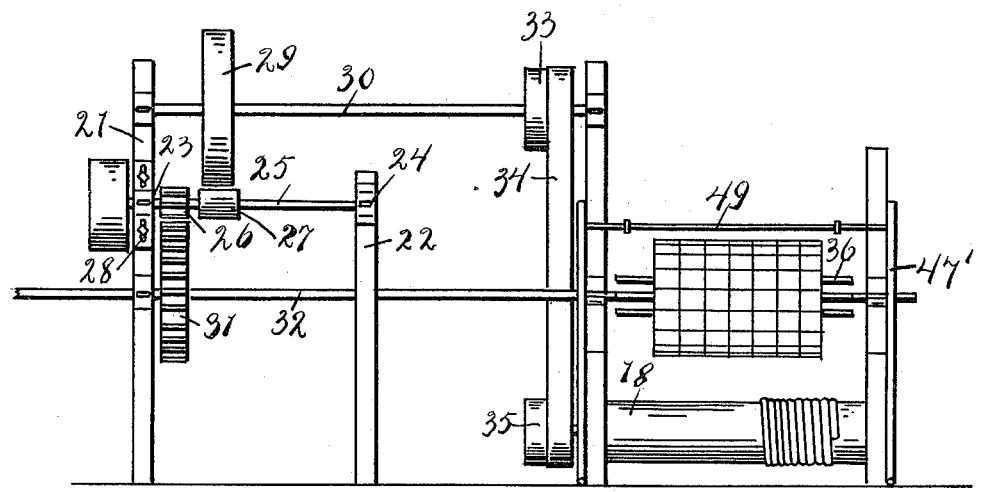
Figure 4:
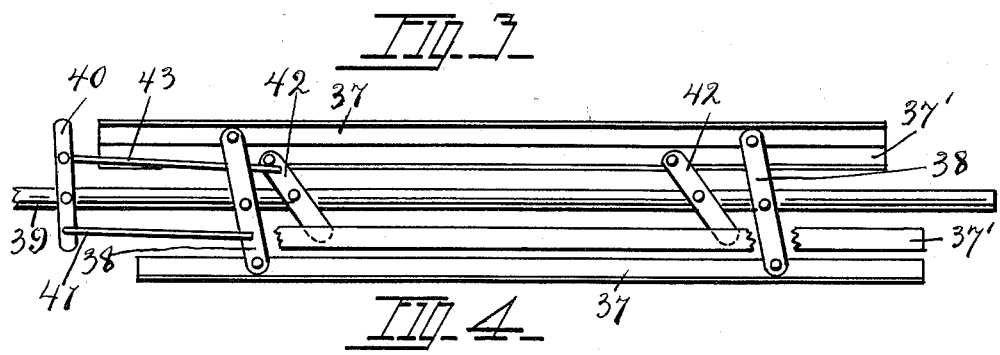
Figure 5:
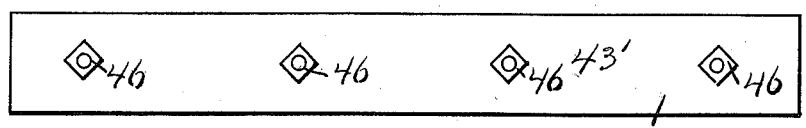
Figure 7:
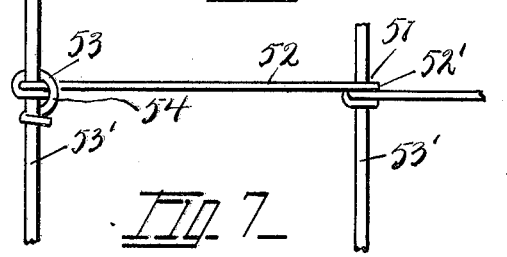
Figure 6:
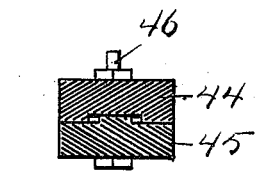

In the drawings, Figure 1 is a top plan view of a complete machine, showing a preferred construction. Fig. 2 is a side elevation of the same. Fig. 3 is a rear elevation showing the reel and power mechanism. Fig. 4 is an elevation of the expansible reel. Fig. 5 is the top plan view of the clamp. Fig. 6 is a transverse section of the same. Fig. 7 is a detail view showing the end and one of the intermediate knots of the fence. Fig. 8 is an end view of the truck. Fig. 9 is a plan view of the truck and a section of fence with the upper plates of the tension-bars removed.

1 designates a rack, upon which are mounted, by suitable bearings 2, wire-reels 3, having band-wheels 4 upon the ends thereof. Upon rack 1 is also mounted a shaft 5, having levers 6 attached thereto. Levers 6 are longitudinally slotted for the reception of connecting-rods 7, which at their opposite ends are attached to bands 8. Bands 8 are carried over band-wheels 4 and are then fastened by any suitable means to rack 1. Upon the outer end of shaft 5 is also mounted lever 9, the general direction of which is similar to levers 6.

10 designates a table of any desirable length, having a track 11 upon the top thereof, upon which is mounted roller-truck 12. At the end of table 10 is located guide 13, consisting of parallel bars 14, held in position by pins 15, so placed that the wires when taken from the reel are held apart at any desired distance, the parallel bars at the same time holding them in the same place. To roller-truck 12 is fastened rope 16, which is carried over pulley-wheel 17, and is turned back again under the table and is attached to reel 18.

19 designates a brake-lever, connected by means of a cable 20 to lever 9, so that when lever 19 is depressed motion is transmitted to shaft 5, thereby causing levers 6 to also depress and put tension upon connecting-rods 7 and bands 8, thereby frictionally holding from revolution the reel-wheels 3. Lever 19 is held when depressed by a suitable fastening 20'. Upon uprights 21 and 22 is journaled, at 23 and 24, power-shaft 25, having a gear-wheel 26 and a friction-wheel 27 thereon.

The boxing of journal 23 is formed with longitudinal slots 28, so that when it is raised friction-wheel 29 upon shaft 30 is set in motion, and when it is lowered gear-wheel 31 upon shaft 32 is made to revolve, it being impossible by their position for both to do so at the same time. Upon shaft 30 is also placed a pulley-wheel 33, which is connected by belt 34 with pulley-wheel 35, which turns reel 18. To shaft 32 is connected by suitable coupling reel 36, formed by bars 37 and 37' in parallel equidistant relation to each other. Parts 37 are held apart by and are connected to pieces 38, which are in turn pivoted at their center to shaft 39 of the reel. Upon the shaft 39 is also pivoted at its center lever 40, which is connected to lever 38 by connecting-rod 41. When lever 40 is operated, it is evident that the distance between parts 37 will increase or diminish. In like manner parts 37' are held apart by levers 42, one of them being attached by connecting-rod 43 to lever 40 in such manner that parts 37 and 37' will approach or recede from shaft 39, thereby varying the size of reel and facilitating the extraction of the reel.

43' is a clamp composed of parts 44 and 45. Part 44 is formed with a recess and part 45 with a projection, the two being held together by bolts 46, so that when the fence 47 is introduced between the two it is held tightly thereby.

Hinged to the framework which supports reel 36 are parallel levers 47', hinged at 48 on supporting-rod 49, rod 49 and clamp 43' being held securely in parallel relation to each other by chain 50. When levers 47' are depressed by clamp 43' they will be brought to a position nearer reel 36, thereby putting tension on the manufactured portion of the fence.

51 is a form of knot usually employed in fastening the cross-wires 52, the end knots being in the form of 53. Knot 51 is formed by three convolutions of wires 52' upon longitudinal wires 53'. End knots 53 are formed by a double convolution of wires 52 upon longitudinal wires 53', being then carried over itself to form a shoulder 54, the end being then turned under wire 53' to hold the shoulder securely.

Roller-truck 12 is mounted upon suitable wheels 55, secured in frame 56. In frame 56 is also secured bottom roller 57, preferably made up of separate parts 58, so that any number may be used when a greater or less breadth of fence is desired. Roller 59 is mounted on standards 60, hinged at 61, and is in close frictional contact with roller 57, being free to move in a vertical position. Roller 59 is made up of separate sections or bars 63, having circumferential grooves 64 thereon. Roller 59 may be made up of any desired number of sections 63 to determine the required width of fence. Tension-bars 65 are mounted upon right and left hand threaded rods 66, having bearings in the pieces 67, attached to hinged standards 60. The ends are preferably squared at 68 to admit of being turned by a crank when it is desired to increase or diminish the distance between tension-bars. The opposite ends of tension-bars are attached to springs 69 by thumb-bolts 70, which permit regulation of tension of the bars by thumb-screws 71. Tension-bars 65 are formed of top and bottom spreader-plates 72, fastened rigidly at 73, and having flanges 74 upon the inner ends thereof. Flanges 74 are slightly separated to admit of the passage of cross-wires 52, thereby bringing shoulders 54 in close sliding contact with flanges 74, so that when tension-bars are separated lateral tension is brought to bear on the fence. The ends of flanges 74 are curved to facilitate the entrance of knots 53. 75 designates a gage having pins 76 driven therein to separate the longitudinal wires while the fence is being constructed.

In operation wire-reels 3 are mounted on rack 1 and brake-lever 19 is raised, thereby releasing the brake from the reel. The wires are then led singly through the guide between the rollers and are attached in any desirable manner to reel 36, the roller-truck taking a position near the reel. Clamp 43' is then adjusted and the brakes are put upon the wire-reels. Tension-levers 47' are depressed, thereby putting tension on the wires through the medium of chain 50 and the clamp. The cross-wires are then cut to proper lengths, gage 75 is set upon the track underneath the wires and near the roller-truck, and the operation of weaving in the cross-wires is commenced. This is done manually by two operatives, who take a position upon each side of the table, and beginning at the two center wires weave toward themselves, the gage 75 being pushed along on the track as it is approached by the operators until the entire length is completed. Friction-wheel 29 is then set in motion by raising the sliding journal 23, thereby causing reel 18 to revolve to cause truck 12 to travel along the track in the direction of reel 3. By this operation lateral tension is brought to bear upon the fence by means of tension-bars 65, thereby drawing up the knots, which in the operation of weaving manually are necessarily somewhat loose. The knots are further tightened by passing between the rollers, the top roller 59, made up of sections 63, being formed with the circumferential grooves 64, through which the knots pass. The intermediate sections of cross-wires are pressed downward on the bottom rollers, thereby tightening the knots to a greater degree. A further object of the tension-bars is to produce a fence of uniform width. When a length which has just been woven is rolled out, clamp 43' is removed and again attached to the longitudinal wires of the fence at a point in front of the roller-truck. It is then fastened to the roller-truck by any convenient means, preferably a pair of chains. The sliding boxings of the journal 23 are then lowered, setting gear-wheel 31 in motion, thereby revolving reel 36, which reels the portion of fence completed and which carries with it roller-truck 12 to the position which it first occupied. The brake is then put upon reels 3, the chains connecting the roller-truck and the clamps are removed, and the clamp is again attached to bar 49. Tension-bars 49' are then depressed, thereby putting tension upon the wires which have just been drawn over the table, and the process of weaving and rolling is repeated, thereby making the operation continuous.

What I claim is—

1. An apparatus for manufacturing wire fence which consists in means for subjecting the longitudinal wires to mechanical tension longitudinally and to lateral separation mechanically by coacting rollers adapted to press the knots into uniformity.

2. In an apparatus for manufacturing wire fence, mechanically-controlled reels, a gage-bar in coaction therewith, and an end reel to receive the finished fence.

3. In an apparatus for manufacturing fence, mechanically-controlled reels, an end reel to receive the finished fence, and grooved rollers intermediate the two for compressing the knots.

4. In an apparatus for manufacturing fence, a plurality of reels to receive the longitudinal wires, spacing-bars coacting therewith, an end reel to receive the finished fence, a clamp interposed between the two, and means for securing tension upon the clamp.

5. In an apparatus for manufacturing wire fence, a plurality of wire-reels, frictionally controlled by a single lever, and means for securing uniformity upon the longitudinal wires.

6. In an apparatus for manufacturing wire fence, mechanically-controlled reels for receiving the longitudinal wires, a reel for receiving the manufactured article, and laterally-movable tension-bars for securing tension upon the transverse wires.

7. In an apparatus for manufacturing wire fence, tension-bars arranged on each side thereof having positive means for separating the same for initial lateral tension, upon the transverse wires and spring-actuated end portions for final tension thereon.

In testimony that I claim the foregoing as my own I hereby affix my signature in presence of two witnesses.

PETER MAST.

Witnesses:
WILLIAM WEBSTER,
PETER J. MENTZ.